United States Patent [19]

Jandrakovic

[11] Patent Number: 5,016,300

[45] Date of Patent: May 21, 1991

[54] PATIENT STANDING ASSISTANCE APPARATUS

[76] Inventor: Joyce A. Jandrakovic, 1408 Magnolia Ave., Zephyrhills, Fla. 34248

[21] Appl. No.: 367,620

[22] Filed: Jun. 19, 1989

[51] Int. Cl.[5] .......................... A22B 1/00; A61G 7/10

[52] U.S. Cl. .......................... 5/85; 4/254; 4/564; 254/394; 297/DIG. 10; 414/921

[58] Field of Search .................... 414/592, 921; 4/564, 4/254; 254/227, 334, 335, 336, 337, 338, 391, 394, 398, 399; 297/DIG. 10; 5/81 R, 83, 85, 87

[56] References Cited

U.S. PATENT DOCUMENTS

| | | | |
|---|---|---|---|
| 885,307 | 4/1908 | Whaley | 5/85 |
| 901,370 | 10/1908 | Poppert | 5/85 |
| 1,059,815 | 4/1913 | Belles | 5/87 |
| 1,103,436 | 7/1914 | Root | 5/87 X |
| 1,214,104 | 1/1917 | Wingire | 254/334 |
| 2,516,553 | 7/1950 | Cole | 4/564 X |
| 2,867,875 | 1/1959 | Davison | 254/391 X |
| 4,530,122 | 7/1985 | Sanders et al. | 5/85 X |
| 4,656,679 | 4/1987 | James | 5/83 X |
| 4,703,523 | 11/1987 | James | 5/83 |
| 4,860,404 | 8/1989 | Flachs | 254/334 X |

FOREIGN PATENT DOCUMENTS

| | | | |
|---|---|---|---|
| 935281 | 11/1955 | Fed. Rep. of Germany | 254/334 |
| 12198 | of 1910 | United Kingdom | 5/87 |

*Primary Examiner*—F. J. Bartuska
*Assistant Examiner*—Robert S. Katz
*Attorney, Agent, or Firm*—Charles E. Lykes

[57] ABSTRACT

An invalid assistance device in which a supported, locked, and guided cable or other flexible line is used to stabilize an invalid in the range of desired vertical positions from sitting to standing while a single attendant can work with the invalid, thus stabilized. Also taught by the present invention is a portable apparatus in which a collapsible tripod is used to mount and support the stabilizing apparatus.

2 Claims, 7 Drawing Sheets

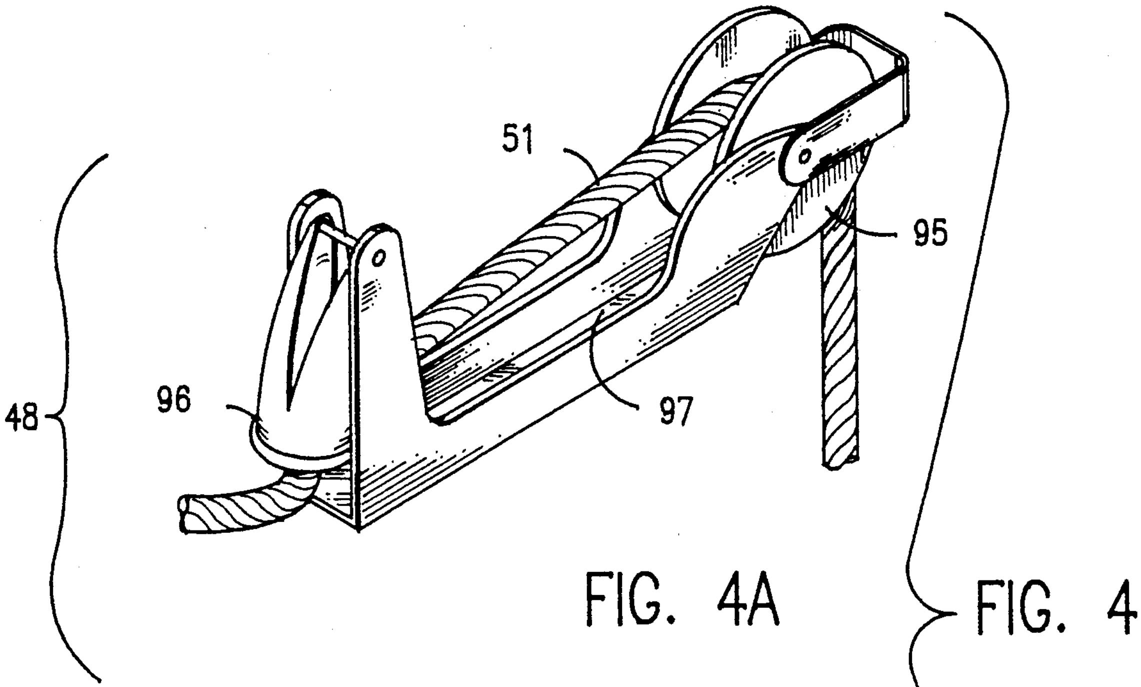
FIG. 4A
FIG. 4
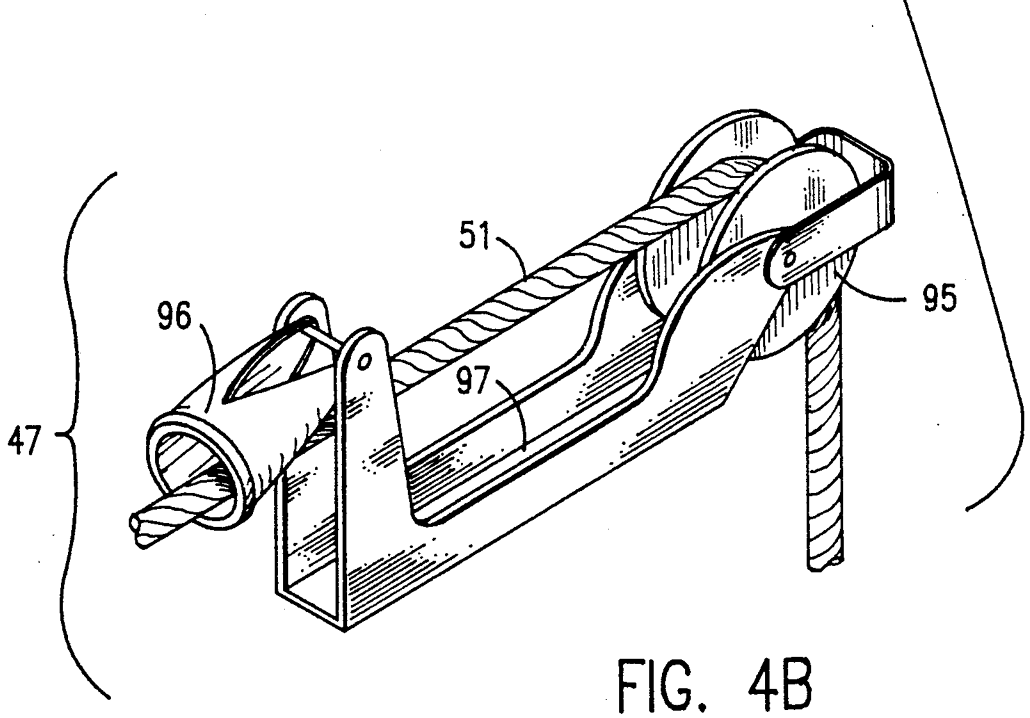
FIG. 4B

PATIENT STANDING ASSISTANCE APPARATUS

BACKGROUND OF THE INVENTION

The invention relates to nursing home devices, particularly those useful in facilitating assistance of invalid persons with day to day hygiene functions.

Many invalid persons suffer from incapacities of a nature which require the continuous assistance of a nurse or relative but do not pose the sort of medical concerns requiring continuous professional care or confinement to an institution. Many of these invalids are not able to walk or support themselves in an upright position. As such, it normally requires two or more persons to assist them with bowel movements, scrub bathing, and baths or showers. The ability to support the invalid in an upright position, while leaving both hands free to work with the invalid, would permit such an invalid to be adequately attended by only one person.

A number of devices exist to provide invalid lifting and moving. One such device is disclosed in U.S. Pat. No. 2,516,553, issued to Cole on Dec. 29, 1986. It comprises a frame on casters equipped with an overhead member and a harness, which is in communication with a power or manual winch through a pulley guided cable. With this device a patient is lifted out of a wheelchair or bed and moved from one place to another by rolling the device on its casters.

Another such device is U.S. Pat. No. 4,530,122, issued to Sanders, et al on July 23, 1985, which discloses, generally, a body sling attached to two rigid supports, such supports being affixed to a pivotal overhead member. By rotating the overhead member, the patient may be lifted or supported in a variety of positions from the bed or wheelchair upon which the apparatus is mounted. As in Cole the lifting of the patient may be accomplished via power assists from a motor-driven or hand crank winch-type device.

U.S. Pat. No. 1,103,436, issued to Root on July 14, 1914, discloses another patient lift device. It comprises a body sling raised or lowered by cable and pulley from an overhead member. The patient is raised or lowered in a sitting position, again with power assistance from a winch-type mechanism.

U.S. Pat. No. 885,307, issued to Whaley on Apr. 21, 1908, teaches a tripod for permanent installation over a patient's bed. It permits a patient to be lifted up from the bed or supported in the upright position. Because of its dependence on permanent attachments to the bed, it does not have the potential to assist an invalid in other locations.

U.S. Pat. No. 1,059,815, issued to Belles on Apr. 22, 1918, teaches a four legged frame, on casters, with a suspending horizontal arc and a full body harness. It permits a patient to be winched up from a bed and rolled to a desired location on casters. Because of its bulk, the device taught in Belles could not be used in small areas.

There have been a number of other devices, disclosed for assisting in the movement and handling invalids. To date however, each such device comprises a relatively elaborate structure and is equipped to lift or stabilize a patient in a given orientation. These devices do not have the simplicity, versatility, or maneuverability required for a variety of hygiene functions and locations. What is needed is a simple device enabling one person to quickly support the invalid in a desired position. It would also be helpful to have such a device which can be moved to a variety of desired locations.

SUMMARY OF THE INVENTION

Apparatus is disclosed which permits the stabilizing of an invalid at virtually any desirable upright position from sitting through a full standing position. The apparatus includes a vertically suspended padded harness, adapted to support an invalid across either the back or shoulder and under the arms, and which is in communication with a locking device through a flexible line, such as a cable or rope.

The apparatus may be suspended from a lightweight portable structure, or it may be suspended from a more permanently affixed structure, such as a frame fastened to a wall near the desired location.

The theory of operation in either case is similar. The harness is positioned on the invalid by slipping it around the invalid's arms and then over the invalid's head. This ensures a snug fit and prevents the likelihood that the invalid may inadvertantly fall out of the harness.

The flexible line from the harness passes through a vertical suspension point, comprising an eye, a pulley, or the like, and then through a line locking means. An example of such line locking means is the Morelan Mfg. Co. "NEVERSLIP . . . ANCHOR ROPE LOCK ®." This device permits a rope to be alternately passed through the device or instantaneously locked into position by the attendant or operator, with only one hand. When in the locked position, the invalid's full weight is supported by the machine.

Since the invalid envisioned by this device is capable of some self-help, the attendant initially assists the invalid in achieving the desired position by the attendant and then released so that the locking device automatically locks the line into place and supports the invalid while cleaning or other assistance is rendered. It should be noted, however, that this device would also be useful and capable of assisting an invalid with no capacity for sitting or standing whatsoever. While two persons may initially be required to fix the invalid into the device, once inserted a single attendant would have both hands free to work with the invalid.

When the operation is completed, the line is again released by pulling it through the locking device from the opposite side of the lock from the invalid. The invalid is then allowed to resume the sitting or lying position and the harness can be removed.

A portable model of the stabilizing unit is also taught. It comprises a vertical support member comprising an upper support member which is mounted on a collapsible tripod assembly. The line locking mechanism is mounted on one of the three tripod legs, which may be connected by support rods at an appropriate level. The vertical support guide (or pulley) is suspended from the upper support member.

The entire apparatus may be folded and easily moved in order to provide support from the precise vertical location. Two support rods may be used to connect the tripod legs in such a manner as to permit one opening between two given tripod legs in order to facilitate access by the invalid as may be necessary to perform a given operation and to facilitate positioning of the tripod over an appliance, such as a toilet, sink, or chair. Near the top of the tripod a chain may be fixed to surround the tripod legs. This gives the device stability in a desired orientation by holding the legs firm, even when the area in which the device is to be used is small such as in a small bathroom.

In one permanently installed version of the stabilizing unit, an upper support member is fixed to the wall so as to extend above the desired location. This upper support member is supported by either an upright member from the floor or fixed to the wall and an angled support beam back to the wall from the distant end of the upper support member. In another permanently installed version, an upper support member may be affixed to suspend from a ceiling joist without further need for support.

The vertical support guide (pulley or eyelets) is then attached to the upper support member. Additional line guide members are placed as needed along the upper support member and support members to permit the line locking device to be placed in an appropriate position.

It is noted that as many line guide means may be placed as needed to permit precise location of the suspended harness as well as convenient location of the line locking means. It should also be noted that the line locking means need not, in either described application, be fixed to part of the harness support structure, but may be mounted upon any suitable and adequately rigid object proximate to the desired location. It is the object of the present invention to provide an apparatus for stabilizing an invalid.

It is a further object of the invention to provide a means of providing the "hands-free" stabilizing of an invalid in a variety of desirable upright positions, such as at the toilet, the sink, or in the shower, so that the invalid may be adequately tended by only one nurse or attendant.

It is further object of the invention to provide a portable apparatus to assist the handling of invalids in a variety of locations.

Other features and advantages of the present invention will be apparent from the following description in which the preferred embodiments have been set forth in conjunction with the accompanying drawings.

BRIEF DESCRIPTION OF THE DRAWINGS

FIGS. 4A and 4B depict a means of locking the flexible line in the open and locked positions.

Exhibit I depicts a folded collapsible tripod.

Exhibit II depicts a wall mounted version.

Exhibit III depicts a person stabilized by the apparatus as described.

DETAILED DESCRIPTION OF THE PREFERRED EMBODIMENTS

Figure 1:
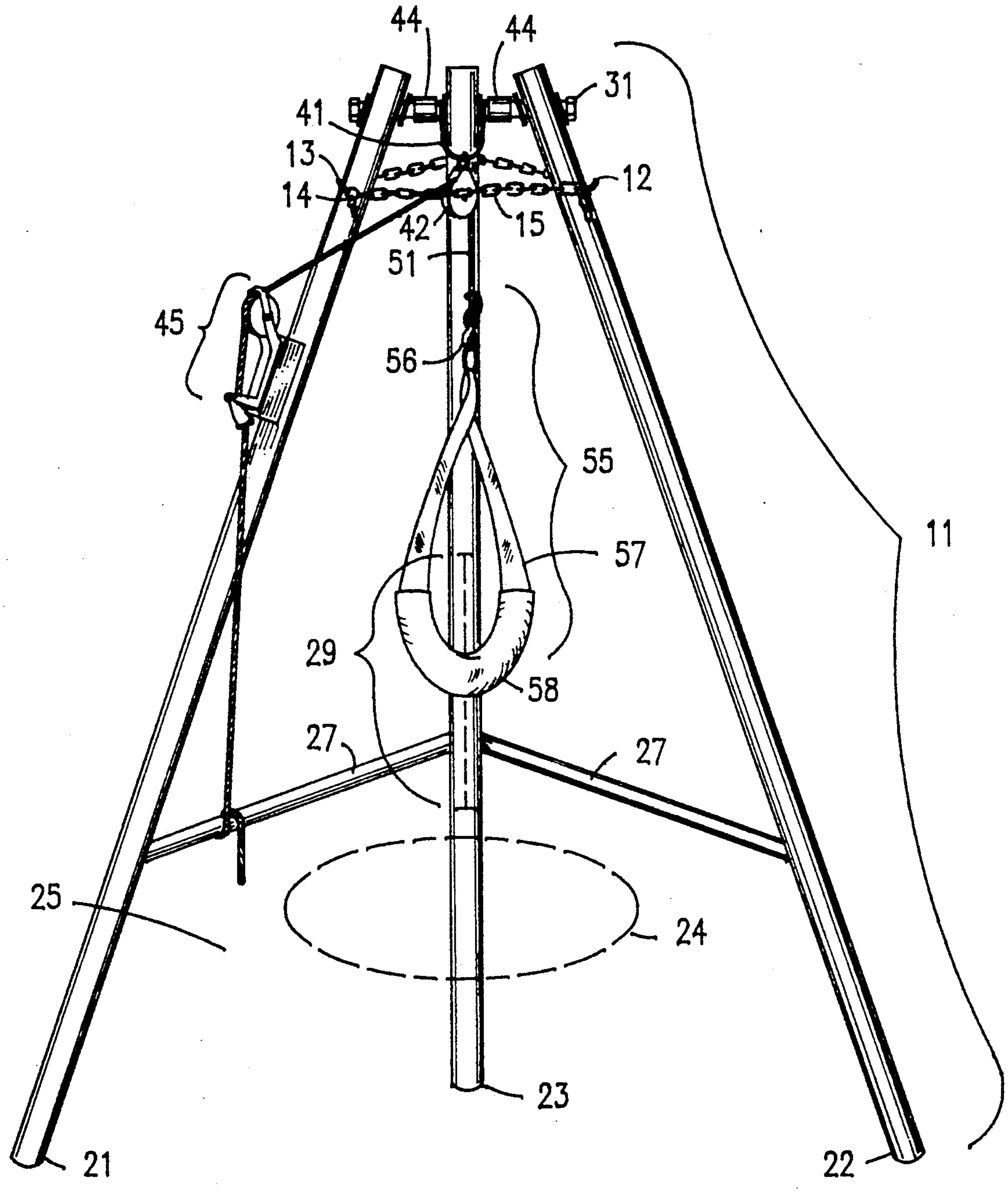
FIG. 1 depicts the portable apparatus.

The invalid support apparatus of the present invention is shown in its various configurations in the figures. FIG. 1 depicts the collapsible tripod mounted system, which offers the advantage of mobility in that the system may be delivered where needed.

Making reference to FIG. 1, the collapsible tripod system (11) is described as follows. Three legs (21, 22, and 23) provide support for the system. Legs (21) and (22) are the left and right outer legs, respectively, and are detachably connected to the center leg (23), which becomes the rear leg in use, by support members (27).

The three legs (21, 22, and 23) are also connected at the top by pivot bolt (31), about which the legs (21, 22, and 23) may pivot as required. From pivot bolt (31) is also a pivotally mounted support (41) for a center pulley (42), through which a flexible line, or cable (51) may be passed. Separators (44) are placed appropriately in order to permit the pivoting legs (21, 22, and 23) and pivoting support (41) to freely pivot without mutual interference.

Together, the support members (27) and the three tripod legs (21, 22, and 23) define a tripod enclosed space (24) which is open on one side (25). This open side (25) permits the tripod system (11) to be easily positioned, by sliding, so that its pivot bolt (31) and center pulley (42) are directly above a toilet (72) (FIG. 3) or other desired fixture or area. The open side (25) further facilitates the entry and exit of the invalid to and from the tripod enclosed space (24).

Additionally, near the top of the tripod system (11) are provided means for stabilizing the device. Each tripod leg (21, 22, and 23) is adapted with an outward extending hook (12, 13) which can receive a desired link (14) of a chain (15). At least one hook (13) is large enough to receive two links (14) of the chain (15). Accordingly, the chain (15) may be positioned around the tripod legs (21, 22, and 23) by placing the desired link (14) within each hook (12, 13) so that the expansion of the tripod system (11) is regulated and stabilized.

Attached to said cable (51) at an end suspended from said center pulley (42) is a harness apparatus (55), comprising a means (56) for connecting said harness apparatus (55) to said cable (51), and a harness loop (57), adapted with a padded sleeve (58).

Figure 2:
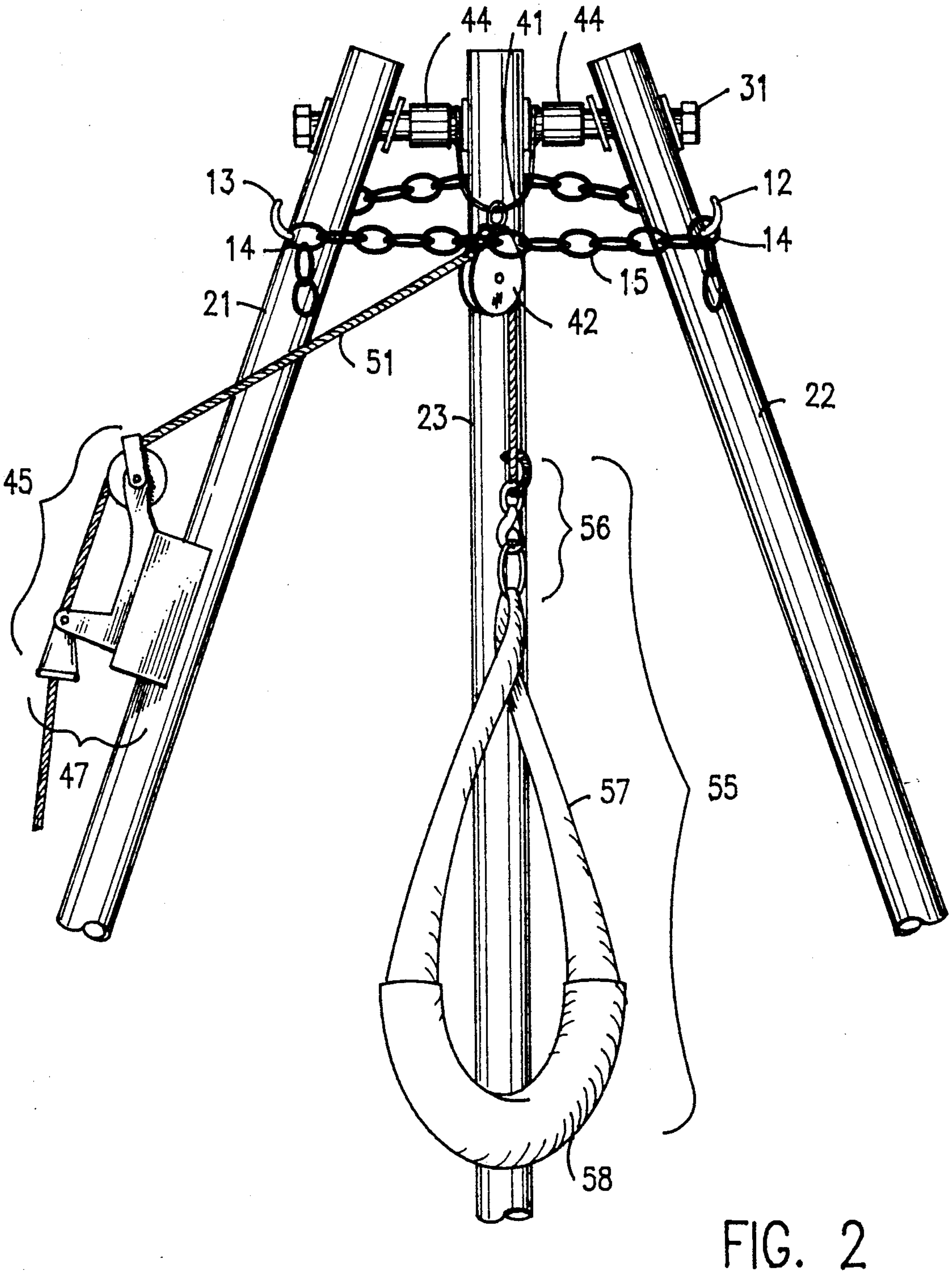
FIG. 2 depicts the upper portion of the portable apparatus, detailing the pulley and chain stabilizer.

Making reference now to FIG. 2, on which is a provided detailed view of the pivot bolt (31) apparatus with pulley (42) and support (41), the operation of the device can be better explained. Additionally, reference should be made to FIGS. 4A and 4B, which are expanded views of the cable locking means (45) and explain its operation as will be detailed later. The cable (51) is, from the harness apparatus (55), passed through the pulley (42) and from there through a cable locking mechanism (45) such as the "NEVERSLIP . . . ANCHOR ROPE LOCK®", more fully depicted in FIGS. 4A and 4B. This cable lock mechanism (45) permits the cable to pass freely through in the direction raising the harness apparatus (55) but said cable (51) may only pass through said locking mechanism (45) in a direction lowering said harness means (55) if the pivoting locking arm (96) is manually pulled into the open position (47) from the locked position (48).

Reference is again made to FIG. 1. While the locking mechanism (45) is held in the open position (47) the cable (51) can pass freely through the pulley (42) and locking mechanism (45) so that the harness apparatus (55) may be raised or lowered to any desired level. If, however, the cable (51) is allowed to pass, unattended, through the locking mechanism (45), the locking arm line guide (96) will immediately assume the locked position (48) and the harness apparatus (55) will be locked in its position.

Figure 3:
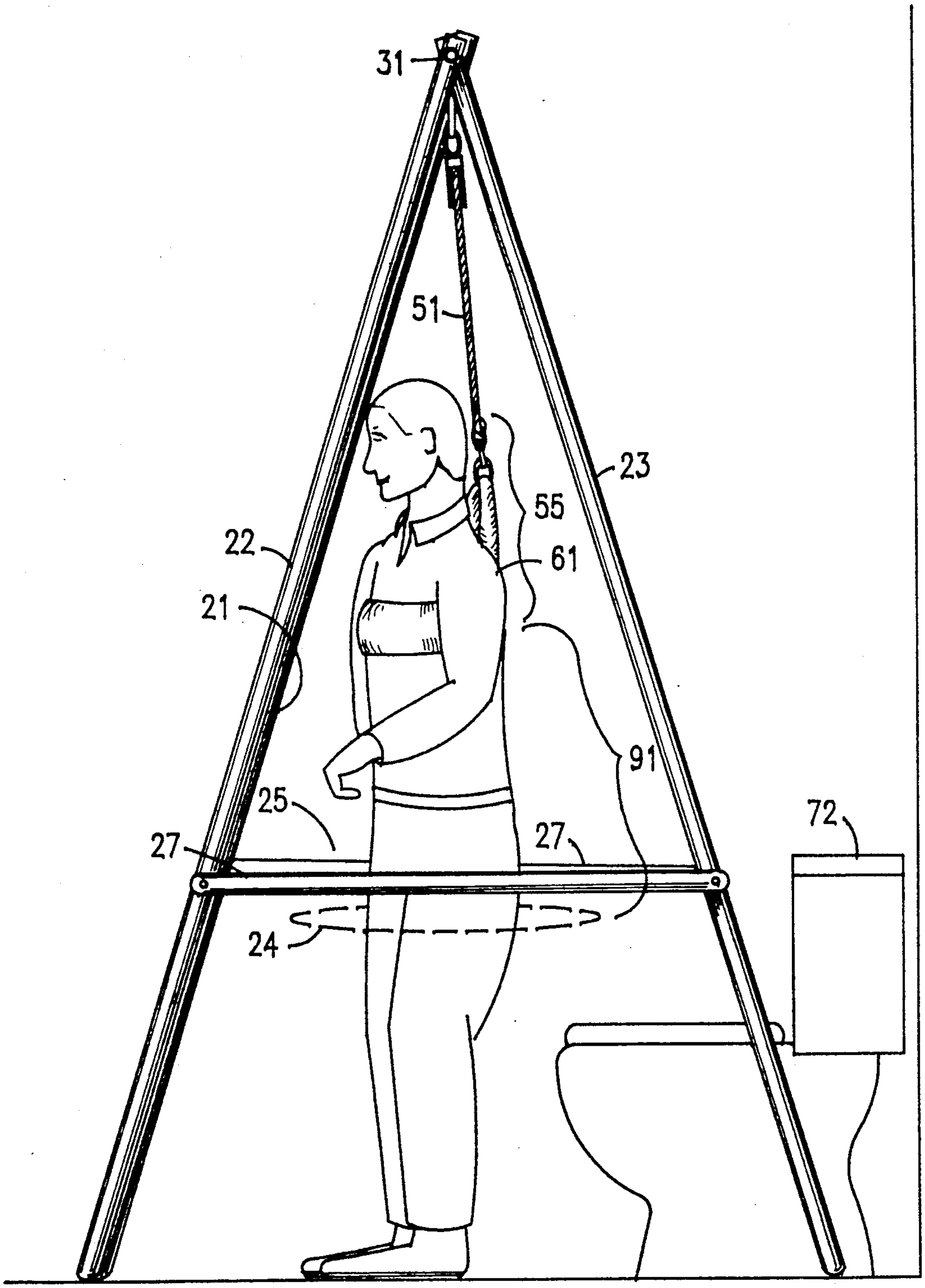
FIG. 3 depicts the preferred embodiment portable apparatus in which a person is being supported.

Making brief reference now to FIG. 3, an invalid person (61) can be inserted into the device by fitting the padded portion (58) of the harness apparatus (55) across their chest and under the arms of said invalid person (61). While the locking arm line guide (96) is in the locked position (48), the invalid will be held in the same position by the harness apparatus (55). An attendant will therefore be free to work with the invalid with both hands as the stabilizer holds the invalid upright.

If it becomes necessary to change the position of the invalid person (61), then the attendant may, with one hand, pull on the cable (51) in a manner so as to cause the locking arm line guide (96) to be held in the open position (47) while assisting the invalid person (61) to obtain the desired new position with the other hand. Upon achieving the desired new position, the cable (51) can be released by the attendant, permitting the locking arm line guide (96) to automatically assume the locked position (48). This will prevent any further motion of the cable (51) and hold the invalid person (61) into position.

Referring now to FIGS. 4A and 4B a suitable line locking mechanism is depicted. Such a device is available on the market and known as "Neverslip . . . Anchor Rope Lock", by the Morelan Manufacturing Co. It comprises a bracket (97), a guiding pulley (95), and a pivotally mounted line guide (96) through which the flexible line (51) may be passed. When allowed to pivot freely and when the line is permitted to pass through the line guide (96) towards the pulley (95), the line guide (96) will be rotated towards the mounting bracket base (97) until the line guide (96) compresses the line (51) and locks the line (51) into place against the mounting bracket base (97). FIG. 4A depicts this apparatus in the locked position and FIG. 4B depicts the apparatus opened to permit the passage of the flexible line (51). In order to release the line (51) it is necessary only to pull up on the line (51) away from the mounting bracket base (97) so that the line (51) may freely pass through the line guide (96).

Figure 5:
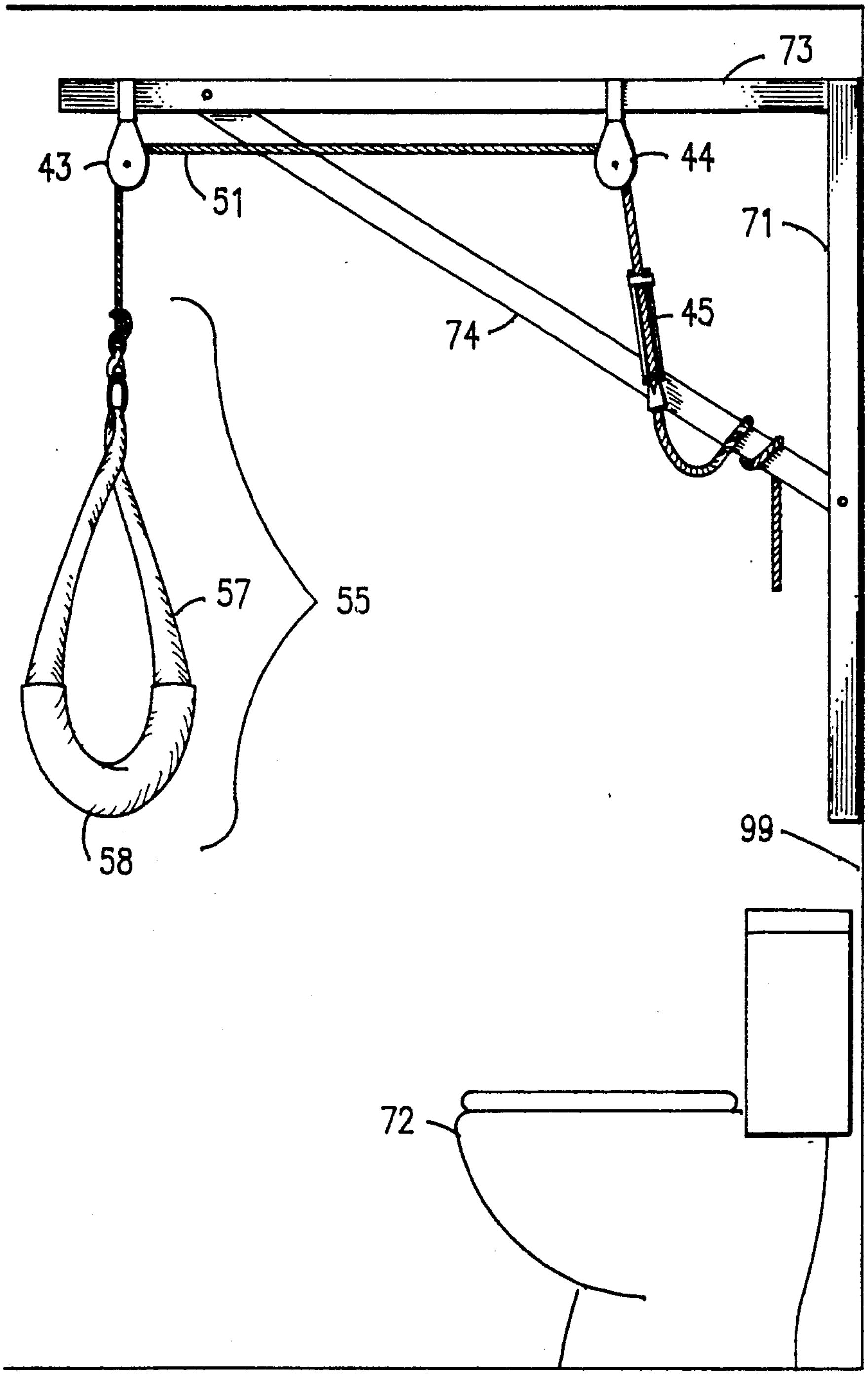
FIG. 5 depicts a version of the apparatus which is permanently mounted upon a wall.

An alternate embodiment of the device is depicted in FIG. 5. It depicts such an apparatus which has been mounted to a wall (99) and suspended above a toilet (72). In this embodiment, the center pulley (42) is replaced by two pulleys (43 and 44) mounted to the horizontal arm (73) of the mounting frame (71) in order to permit the cable (51) to be directed through a useful path, such as over a toilet (72), (as depicted in FIG. 5) sink, or vanity (not depicted).

The locking mechanism (45) is now mounted upon a support brace (74) such that the cable (51) is easily within the reach of an attendant working with an invalid (61).

This alternative embodiment additionally demonstrates that any number of pulleys can be used in order to permit the cable (51) to be routed in the desired manner. Additionally, the pulleys could be replaced with another acceptable means for guiding the cable, or line, such as a shroud or eyelets.

Figure 6:
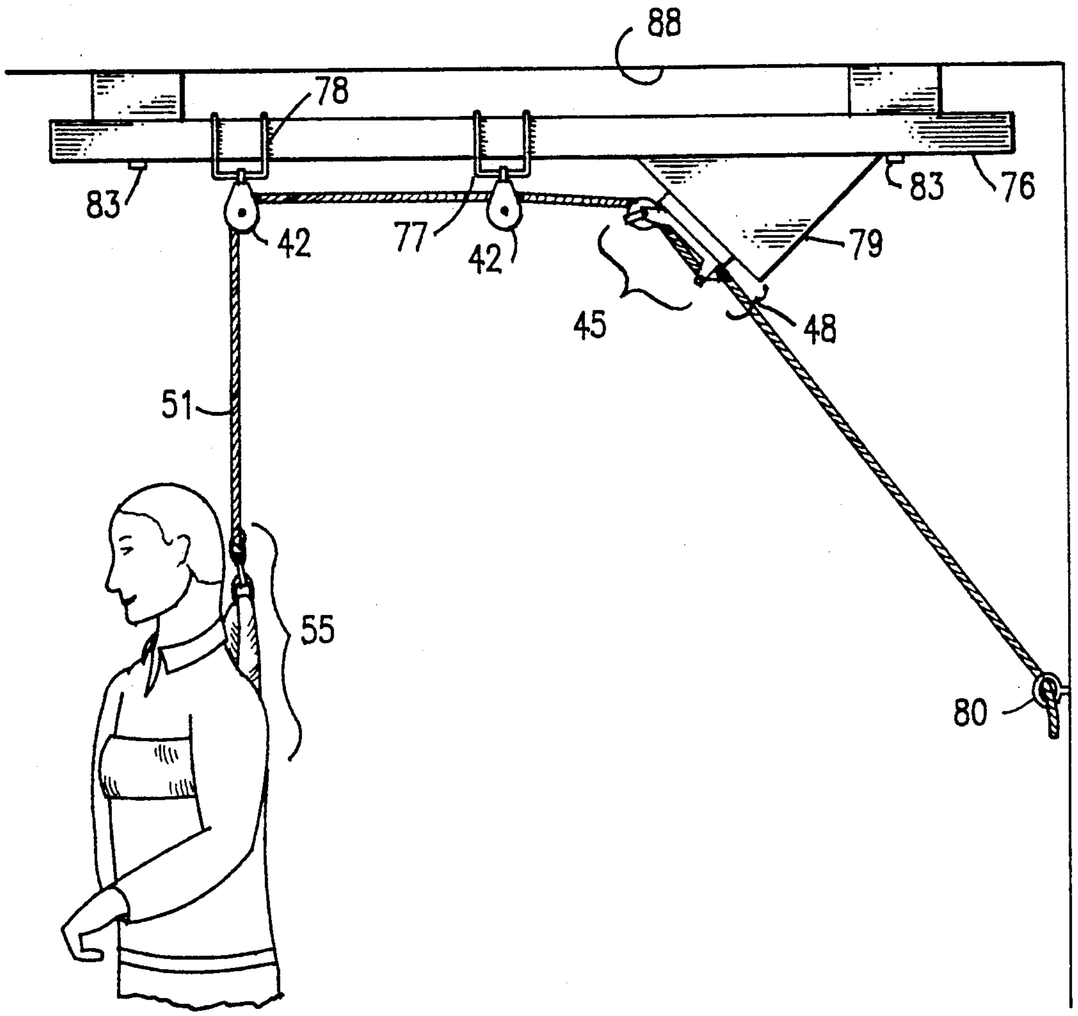
FIG. 6 depicts a version of the apparatus which is permanently suspended from the ceiling.

A further alternate embodiment is depicted by FIG. 6. This embodiment is designed to make use of the existing room features for support and comprises a permanently fixed, single location embodiment of the invention.

In an example of this embodiment, bolts (83) are used to mount a support beam (76) to a ceiling (88). The pulleys (42) are fixed to the support beam with pulley mounts (75) and placed at appropriate locations (77 and 78) along the beam (76), which is adapted with a mount (79) for the locking mechanism (45). The cable (51) is then directed from an invalid stabilization region (29) to any convenient tie off location (80). In another form of this embodiment, pulleys (42) could be fastened directly to the ceiling, much as a light fixture is installed. The locking mechanism (45) could be secured directly to a wall (99), FIG. 5, or a nearby sink or vanity (not depicted).

As has been demonstrated in each of the embodiments of the present invention, the cable (51) is directed from a beginning point of locking through one or more pulleys, (42, 44) and finally suspended from a pulley (45) positioned above the stabilization area. The various pulleys (42, 43, 44, and 45) are used to guide the cable from a convenient locking point to a useful invalid stabilization region.

Figure 7A:
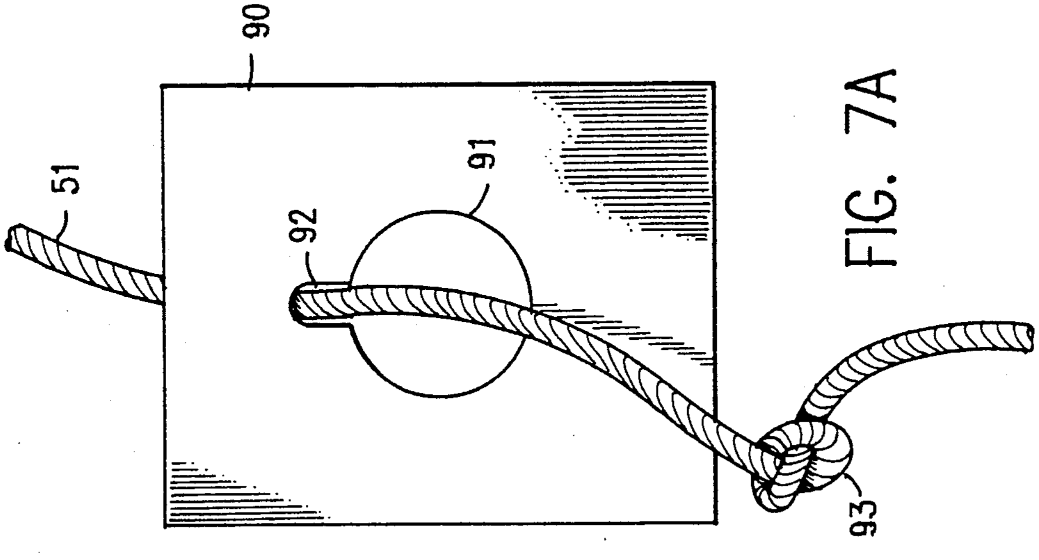
FIGS. 7A and 7B depict an alternative line locking apparatus.
Figure 7B:
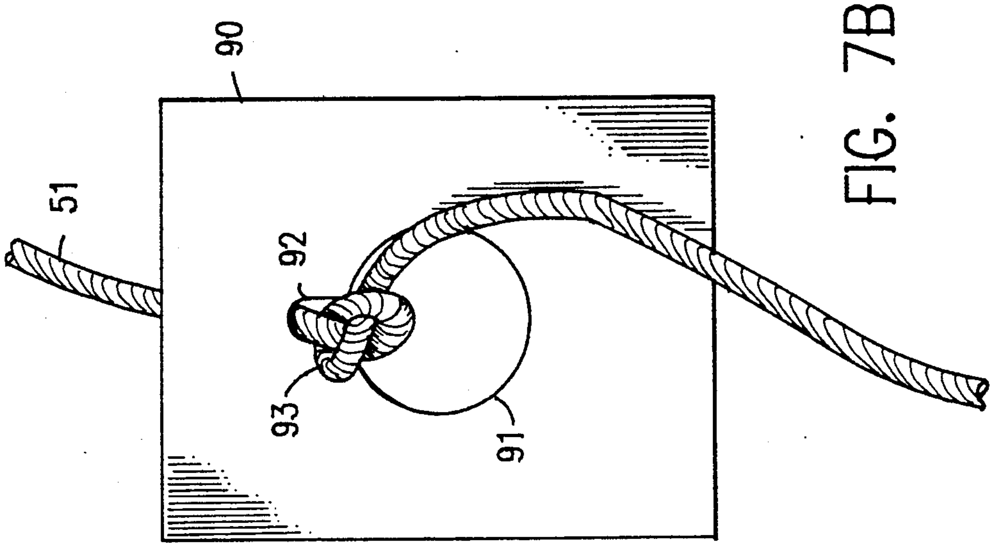

An alternative means of locking the line into place is depicted in FIGS. 7A and 7B. A bracket (90) comprising an opening (91) with a notch (92) is depicted. The opening (91) is of adequate diameter to permit the easy passage of the flexible line (51) in which a knot (93) has been tied as shown in FIG. 7A. The notch (92) however, is of adequate diameter to permit the passage of only the flexible line (51) without the knot (93), as shown in FIG. 7B. By mounting the bracket to a suitable position on the support means (not depicted in FIGS. 7A or 7B) such that the notch (92) is above the opening (91) the line (51) can be locked into position at the knot (93) and held there by the weight of the invalid.

It is also possible to consider the stabilizing chain (15) alone as sufficient to stabilize the apparatus (11) without the stabilizing arms (27). The use of both the chain (15) and the arms (27) is depicted in FIGS. 1. through 3. The use of the stabilizing chain (15) alone offers the advantages of leaving all paths between the tripod legs (21, 22, 23) open while providing stabilization from all sides. The optional use of the stabilizing arms (27) may offer an invalid person an additional means of support as well as providing the apparatus with additional stability.

Modification and variation can be made to the disclosed embodiments without departing from the subject and spirit of the invention as defined in the following claims. Such modifications and variations, as included within the scope of these claims, are meant to be considered part of the invention as described.

What is claimed is:

1. A portable apparatus for supporting an invalid person through a range of vertical positions from sitting to standing, the apparatus comprising a collapsible tripod with support means;

said support means being of adequate strength to support the weight of a person and further comprising an upper support member, said upper support member being further adapted with a pulley through which a flexible line of adequate strength to support a person may be passed and suspended through an area for supporting an invalid person in a vertical position;

said flexible line further comprising a rope being adapted at one end with a holding means comprising a padded loop which may be passed over the torso of an invalid person;

locking means for locking said flexible line at a selected point along its length which is further mounted upon said support means, said locking means further comprising a line-locking bracket upon which is pivotally mounted a cylindrical line passing means though which said flexible line may freely pass in one direction but through which the attempted passage of said flexible line in the opposite direction will cause said cylindrical line passing means to pivot towards and compress said flexible line upon said bracket at some point along the length of said flexible line and lock said flexible line at said point of compression;

guiding means for guiding said flexible line through said line locking means, said pulley, and through said vertical invalid support area which is further mounted upon said support means;

said collapsible tripod further comprising a first leg, said first leg being centrally pivotally mounted to said upper support member so as to pivot about said support member in one plane and second and third tripod legs being pivotally mounted upon said support member on either side of said first leg so as pivot about said support member in planes substantially perpendicular to the plane of rotation of said first leg;

a stabilizing chain;

each of said tripod legs further being adapted at points near to and equidistant from said support member with a hook extending from each said tripod leg generally in the direction of pivot, two of said hooks being of adequate size to accept a link of said stabilizing chain and one said hook being of adequate size to accept two links of said stabilizing chain; and said stabilizing chain being of adequate length to surround said tripod legs at the point of said hooks and of adequate strength to stabilize said apparatus bearing the weight of an invalid person.

2. The invention described in claim 1 in which said tripod legs are further adapted with two stabilizing arms, said stabilizing arms being further adapted to adjustably connect the said first tripod leg with said second and third tripod legs.

* * * * *